US007508836B2

(12) United States Patent
Nakajima (10) Patent No.: US 7,508,836 B2
(45) Date of Patent: Mar. 24, 2009

(54) DATA PROCESSING APPARATUS AND METHOD FOR HANDLING TRANSACTIONS (75) Inventor: Satoshi Nakajima, Cambridge (GB)

(73) Assignee: ARM Limited, Cambridge (GB)

( * ) Notice: Subject to any disclaimer, the term of this patent is extended or adjusted under 35 U.S.C. 154(b) by 1017 days.

(21) Appl. No.: 11/000,504

(22) Filed: Dec. 1, 2004

(65) Prior Publication Data
US 2006/0114921 A1 Jun. 1, 2006

(51) Int. Cl.
H04L 12/28 (2006.01)
H04J 3/16 (2006.01)

(52) U.S. Cl. ........................ 370/412; 370/465
(58) Field of Classification Search ................. 370/412, 370/465
See application file for complete search history.

(56) References Cited

U.S. PATENT DOCUMENTS

| 7,239,612 | B1* | 7/2007 | Cole et al. ............... 370/230.1 |
| 7,283,472 | B2* | 10/2007 | Widmer et al. ........... 370/230.1 |
| 2002/0003777 | A1* | 1/2002 | Miyamoto .................. 370/236 |
| 2002/0030688 | A1* | 3/2002 | Shimomura et al. ......... 345/542 |
| 2002/0061027 | A1* | 5/2002 | Abiru et al. ................. 370/413 |
| 2003/0152083 | A1* | 8/2003 | Nagata et al. ............ 370/395.4 |
| 2004/0213243 | A1* | 10/2004 | Lin et al. ................. 370/395.1 |
| 2005/0041970 | A1* | 2/2005 | Harai .......................... 398/51 |
| 2006/0109857 | A1* | 5/2006 | Herrmann .................... 370/412 |
| 2007/0156833 | A1* | 7/2007 | Nikolov et al. .............. 709/207 |
| 2008/0037549 | A1* | 2/2008 | Haardt et al. ............ 370/395.4 |
| 2008/0239949 | A1* | 10/2008 | Nishizaki ................... 370/230 |

* cited by examiner

Primary Examiner—Andrew Lee
(74) Attorney, Agent, or Firm—Nixon & Vanderhye P.C.

(57) ABSTRACT

A data processing apparatus and method are provided for handling transactions issued to a slave device from a master device. Each transaction involves the transfer of one or more data packets between the master device and the slave device. The data processing apparatus comprises a buffer storage operable to buffer the data packets of one or more transactions during transfer of those data packets between the master and slave devices, and buffer control logic is used to control the operation of the buffer storage. In a normal mode of operation the buffer control logic causes the buffer storage to operate as a FIFO storage for buffering the data packets so as to maintain the temporal order of those data packets. However, upon receipt of a high priority transaction, the buffer control logic causes the buffer storage to operate in an alternative mode of operation in which an allocated portion of the buffer storage is reserved for buffering data packets associated with that high priority transaction, whilst the remaining portion of the buffer storage is retained for buffering of the data packets of other transactions. By this approach, when the buffer storage is operating in the alternative mode of operation data packets in the allocated portion may be output from the buffer storage out of temporal order with respect to data packets in the remaining portion, thus facilitating quicker handling of the high priority transaction than would otherwise be possible.

19 Claims, 9 Drawing Sheets

DATA PROCESSING APPARATUS AND METHOD FOR HANDLING TRANSACTIONS

BACKGROUND OF THE INVENTION

1. Field of the Invention

The present invention relates to a data processing apparatus and method for handling transactions issued to a slave device from a master device.

2. Description of the Prior Art

In a data processing system in which transactions are issued from master devices to slave devices, a controller is often provided in association with a slave device to handle transactions issued to that slave device by one or more master devices. Each transaction typically involves the transfer of one or more data packets between the master device and the slave device, and depending upon the type of transaction the transfer of data packets may occur in either or both directions between the master device and the slave device.

For example, for a write transaction, a number of data packets will be transferred from the master device to the slave device via the controller, with the number of data packets depending on the burst size of the data being written. Each packet will typically include command data (in this case identifying that the transfer is a write transfer) and any associated data (in this case the data to be written), and the size of each data packet may be fixed or configurable. For example, depending on the width of the bus interconnecting the master and slave devices, the data packets may be 32 bits, 64 bits, 128 bits, etc in length.

Similarly, for a read transaction, there will typically be a data packet transferred from the master device to the slave device to initiate the read operation, followed by one or more data packets transferred from the slave device back to the master device incorporating the required data.

Typically, the controller associated with the slave device is arranged to buffer the data packets that it receives within a buffer storage of the controller, this buffer storage typically being arranged as a First-In-First-Out (FIFO) storage. This FIFO storage is typically used to enable signals to be synchronised between the slave device and the controller clock domain, and to aim to optimise the data transfer rate between the controller and the system memory. The system memory may be any memory area that the master device can access, for example cache, on-chip memory, external memory, etc. In one particular example, the slave device may be a removable memory device, and the master device is a digital signal processor (DSP) or Micro Processing Unit (MPU), with the data retrieved from the removable memory device being stored in system memory accessible by the DSP/MPU.

Due to cost and size considerations, it is desirable that the structure of the controller for the slave device is kept as small and simplified as possible. This typically dictates that a single FIFO structure is provided to perform buffering within the controller. This imposes a number of constraints on the transfer of data packets between the master and slave devices. In particular, it is not possible to change the data direction until the FIFO is empty. Hence, whilst the FIFO contains data packets being transferred from the master device to the slave device, it is not possible for the slave device to return data packets for routing to the master device.

Another issue is that of handling high priority transactions. Typically, the controller has no mechanism for prioritising between transactions, and each transaction is treated equally with its data packets merely being placed in the FIFO storage so that those data packets are transferred in temporal order. This means that if an interrupt command is issued to the slave device, the associated data packet is queued in the FIFO and is then not executed until it reaches the head of the FIFO and can be routed onto the slave device. This clearly imposes a delay in handling the interrupt command.

Considering as an example of the slave device a flash-based removable memory device, such constraints have typically been considered acceptable, since the page unit size of the memory has been relatively small, and hence the number of data packets involved in any particular transaction has been relatively low. However, it is likely that as flash technology develops this will cause the page unit size to increase, which means that the potential latency before high priority commands such as interrupt commands are processed, or before data direction can be changed, becomes longer. Furthermore, the development of flash technology is likely to lead to more complex functional command operations being issued to the slave device, and in such situations the inability to handle transactions differently within the controller may cause unacceptable delays in the handling of certain transactions.

Whilst such delays could be alleviated by the duplication of certain hardware within the controller, so as to provide a number of paths through the controller, this would significantly increase the size and complexity, and hence cost, of the controller.

Accordingly, it would be desirable to improve the handling of transactions within the controller without significantly increasing the cost and complexity of that controller.

SUMMARY OF THE INVENTION

Viewed from a first aspect, the present invention provides a data processing apparatus for handling transactions issued to a slave device from a master device, each transaction involving the transfer of one or more data packets between the master device and the slave device, the data processing apparatus comprising: a buffer storage operable to buffer the data packets of one or more transactions during transfer of those data packets between the master and slave devices; buffer control logic operable to control the operation of the buffer storage; in a normal mode of operation the buffer control logic being operable to cause the buffer storage to operate as a FIFO storage for buffering the data packets so as to maintain the temporal order of those data packets; upon receipt of a high priority transaction, the buffer control logic being operable to cause the buffer storage to operate in an alternative mode of operation in which an allocated portion of the buffer storage is reserved for buffering data packets associated with that high priority transaction, whilst a remaining portion of the buffer storage is retained for buffering of the data packets of other transactions; whereby when the buffer storage is operating in the alternative mode of operation data packets in the allocated portion may be output from the buffer storage out of temporal order with respect to data packets in the remaining portion.

In accordance with the present invention, a data processing apparatus (for example a controller associated with a slave device) has a buffer storage for buffering the data packets of one or more transactions, and buffer control logic to control the operation of the buffer storage. In a normal mode of operation the buffer storage operates as a FIFO storage for buffering the data packets so as to maintain the temporal order of those data packets. However, upon receipt of a high priority transaction, the buffer control logic is operable to cause the buffer storage to operate in an alternative mode of operation in which an allocated portion of the buffer storage is reserved for buffering data packets associated with that high priority transaction. In this alternative mode of operation, the remaining portion of the buffer storage is retained for buffering of the data packets of other transactions. Hence, by this approach, the data packets in the allocated portion may be output from the buffer storage out of temporal order with respect to data packets in the remaining portion, thus facilitating a more rapid processing of the high priority transaction.

Accordingly, it can be seen that in accordance with the present invention, a buffer storage that typically acts as a FIFO storage can in this alternative mode of operation be arranged to operate in a manner which no longer strictly maintains the temporal order of data packets received, but instead employs an allocated portion of the buffer storage for storing data packets associated with a high priority transaction. The destination device for those high priority data packets, whether that be the master device or the slave device, can then retrieve those high priority data packets earlier than would be possible if they had been stored in their strict temporal order within a single FIFO structure.

It will be appreciated that there are a number of ways in which the data packets in the allocated portion may be output from the buffer storage out of temporal order with respect to data packets in the remaining portion. For example, the controller may contain interface logic coupled to the master device and further interface logic coupled to the slave device, with these pieces of interface logic receiving signals indicating when there are data packets present in the allocated portion and reacting to those signals in order to retrieve data packets from the allocated portion. It will be appreciated that such interface logic could employ a number of schemes for deciding when to retrieve the data from the allocated portion. For example, it may be arranged, as soon as it is determined that there is data in the allocated portion, to retrieve data packets from the allocated portion in preference to data packets in the remaining portion. Alternatively some form of round-robin scheme may be employed where the interface logic alternates between seeking to retrieve data packets from the allocated portion and the remaining portion.

It will be appreciated that there are a number of ways in which transactions may be identified as being high priority transactions. Herein, the phrase "high priority" is used merely to indicate a transaction which has a priority higher than the transactions handled in the normal mode of operation. In one embodiment, each transaction has a tag value associated therewith to indicate a type of transaction, with the buffer control logic being operable to detect the high priority transaction from its associated tag value. The tag value may in one embodiment be associated with the transaction at the time the transaction is issued by the master device.

In an alternative embodiment, the buffer control logic may be arranged to determine a high priority transaction by partially decoding the received data packet in order to identify whether the transaction is one of a number of predetermined high priority transactions. In one particular embodiment, the buffer control logic may reference the tag value and/or other information indicative of transaction type decoded from the received data packet in order to determine the priority of the transaction.

It will be appreciated that the allocated portion can be reserved for as long as it is considered appropriate having regards to the particular implementation. However, in one embodiment, upon completion of the high priority transaction the buffer control logic causes the buffer storage to return to the normal mode of operation. As part of this process, the allocated portion of the buffer storage is released so that the entire buffer storage can then again operate as a FIFO storage.

In one embodiment, the size of the allocated portion may be configurable. However, in an alternative embodiment the allocated portion is of a predetermined size. In such embodiments, the number of data packets associated with the identified high priority transaction(s) is predetermined, and accordingly it is appropriate to define a predetermined size for the allocated portion.

It will be appreciated that there are a number of ways in which the allocated portion may be defined. For example, the location of the allocated portion could be fixed, with that area always being the last to be used in the normal mode of operation. However, in an alternative embodiment, the allocated portion is not fixed, but the allocated portion is reserved in an area of the storage buffer that is unused at the time of entering the alternative mode of operation. Once reserved, the allocated portion is then only used for high priority transfers until those transfers are complete.

The high priority transaction may be one of a number of different transactions. However, in one embodiment the high priority transaction is an interrupt transaction. An interrupt transaction may be used, for example, to cause early termination of a transaction or to cause a device status query to be performed.

In some embodiments, more than one high priority transaction may be defined, and once the allocated portion of the buffer storage has been reserved, it may be used to store the data packets associated with more than one high priority transaction, with the remaining portion being used to store the data packets of any transactions which are not high priority transactions.

The slave device may take a variety of forms. However, in one embodiment, the slave device is a storage device. In one particular embodiment, the storage device may be a flash-based removable memory device.

In one embodiment, in the normal mode of operation the buffer storage may only store data packets being transferred in the same direction between the master and slave devices, whereas in the alternative mode of operation the buffer storage may store in the allocated portion data packets being transferred in a different direction to those data packets in the remaining portion.

Hence, as an example, data packets issued by the slave device during processing of an interrupt transaction may be stored in the allocated portion whilst data packets of a write transaction issued by the master device may be stored in the remaining portion of the buffer storage. Hence, a change in data direction is possible when handling a high priority transaction without needed to drain the data packets in the remaining portion of the buffer storage.

Further, depending on the nature of the slave device, it may be possible to interleave transfers from the allocated portion and the remaining portion, such that if, for example, the allocated portion is temporarily empty, data packets from the remaining portion could be transferred whilst waiting for a new data packet to be placed in the allocated portion.

Viewed from a second aspect, the present invention provides a method of handling transactions issued to a slave device from a master device, each transaction involving the transfer of one or more data packets between the master device and the slave device, the method comprising the steps of: buffering within a buffer storage the data packets of one or more transactions during transfer of those data packets between the master and slave devices; in a normal mode of operation, causing the buffer storage to operate as a FIFO storage for buffering the data packets so as to maintain the temporal order of those data packets; upon receipt of a high priority transaction, causing the buffer storage to operate in an alternative mode of operation in which an allocated portion of the buffer storage is reserved for buffering data packets associated with that high priority transaction, whilst a remaining portion of the buffer storage is retained for buffering of the data packets of other transactions; and when the buffer storage is operating in the alternative mode of operation, outputting from the buffer storage data packets in the allocated portion out of temporal order with respect to data packets in the remaining portion.

Viewed from a third aspect, the present invention provides a data processing apparatus for handling transactions issued to a slave device from a master device, each transaction involving the transfer of one or more data packets between the master device and the slave device, the data processing apparatus comprising: buffer means for buffering the data packets of one or more transactions during transfer of those data packets between the master and slave devices; buffer control means for controlling the operation of the buffer means; in a normal mode of operation the buffer control means being operable to cause the buffer means to operate as a FIFO storage for buffering the data packets so as to maintain the temporal order of those data packets; upon receipt of a high priority transaction, the buffer control means being operable to cause the buffer means to operate in an alternative mode of operation in which an allocated portion of the buffer means is reserved for buffering data packets associated with that high priority transaction, whilst a remaining portion of the buffer means is retained for buffering of the data packets of other transactions; whereby when the buffer means is operating in the alternative mode of operation data packets in the allocated portion may be output from the buffer means out of temporal order with respect to data packets in the remaining portion.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
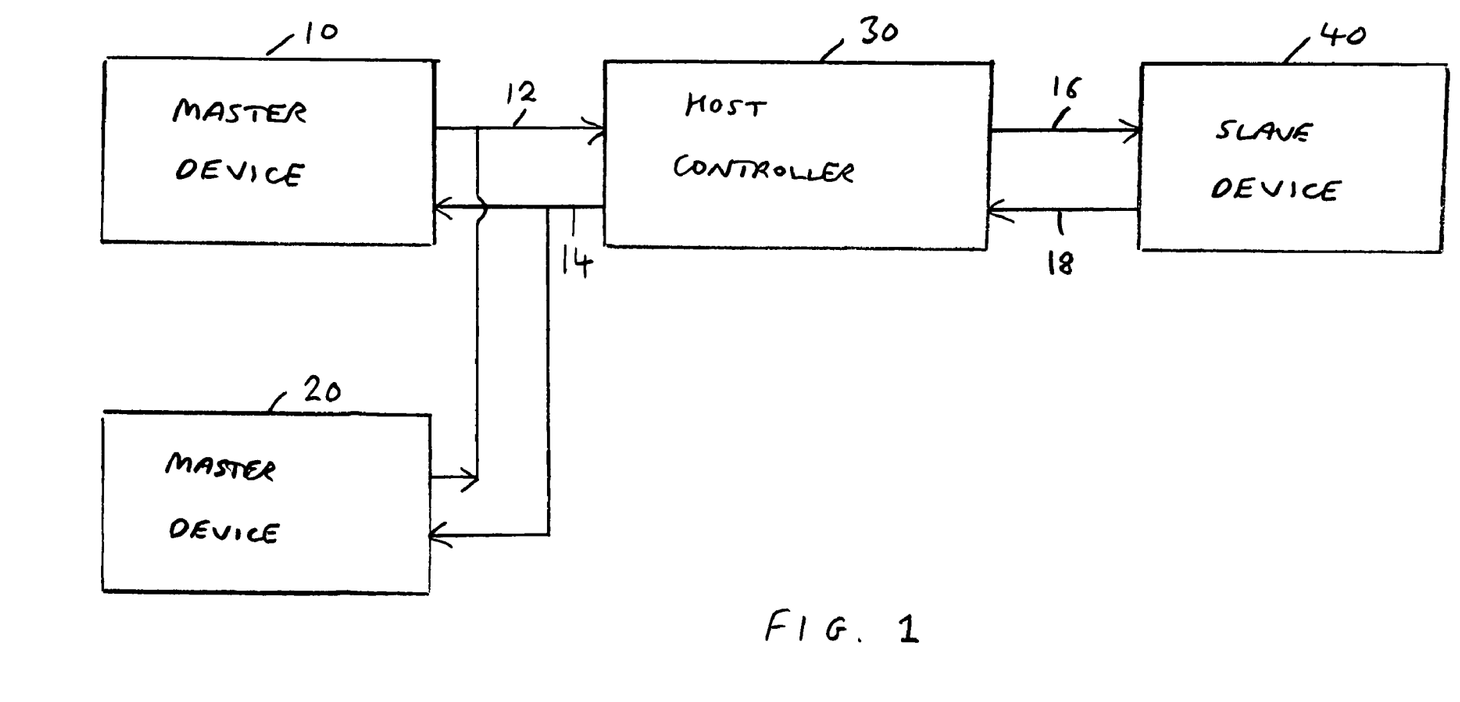
FIG. 1 is a block diagram of a data processing system incorporating a host controller in accordance with one embodiment of the present invention.

FIG. 1 is a block diagram of a data processing system in which techniques of embodiments of the present invention may be utilised. The data processing system includes two master devices 10, 20 which are coupled to a slave device 40 via a host controller 30, the host controller 30 controlling access to the slave device 40 using a command-based signal protocol. Each master device 10, 20 can issue a transaction to the slave device 40, which causes one or more data packets to pass between the relevant master device 10 and the slave device 40. For a write transaction this will typically involve the transfer of a number of data packets from the master device to the slave device to cause data to be written into specified locations within the slave device, whilst for a read transaction, a data packet will be issued from the master device to the slave device to identify the read operation, and thereafter one or more data packets will be returned from the slave device 40 to the appropriate master device 10, 20 including the identified data.

The slave device 40 may be some form of memory device, for example a flash-based removable memory device, or may be some other form of slave device, for example an LCD controller having some storage therein for storing data to be displayed.

Data packets issued from a master device 10, 20 to the slave device 40 are routed over data path 12 to the host controller 30, where they are typically buffered within the host controller, and from there are passed over data path 16 to the slave device. Similarly for data packets being issued from the slave device 40 to one of the master devices 10, 20, these data packets will be issued over data path 18 to the host controller 30, where they are typically buffered therein, and from there will be passed over data path 14 to the appropriate master device 10, 20. The data paths 12, 14, 16 and 18 will typically be implemented by a bus infrastructure interconnecting the master devices 10, 20, the host controller 30 and the slave device 40. Such bus infrastructures may often be quite complex, and in particular may not merely comprise the direct connections illustrated schematically in FIG. 1. Further, it will be appreciated that a typical data processing system will often be more complex than that illustrated in FIG. 1. The relevant point to note however is that the slave device 40 is accessible by master devices 10, 20 via the host controller 30, with the controller controlling access to that slave device. In systems including more than one such slave device, there will typically be a separate host controller for each such slave device.

Figure 2:
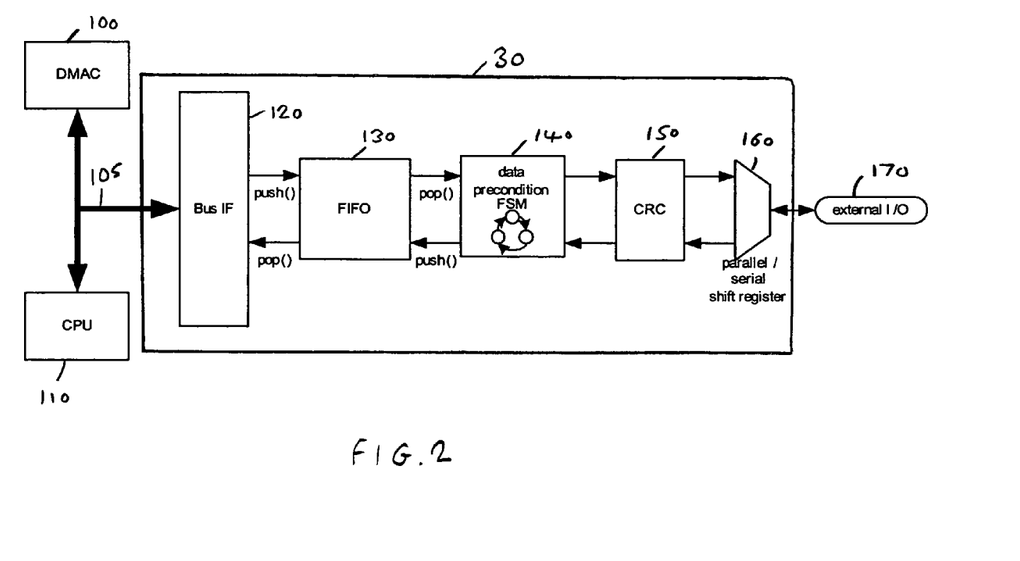
FIG. 2 is a block diagram illustrating in more detail components provided within the host controller in one embodiment of the present invention.

FIG. 2 is a block diagram illustrating in more detail the elements provided within the host controller 30 in accordance with one embodiment of the present invention. In this example, two master devices take the form of a Direct Memory Access Controller (DMAC) 100 and a Central Processing Unit (CPU) 110. A bidirectional bus structure 105 couples the DMAC 100 and the CPU 110 with the host controller 30, and in particular with bus interface logic 120 of the host controller 30.

A FIFO storage structure 130 is provided for temporarily buffering data packets passing through the host controller 30. In a normal mode of operation, as will be discussed in more detail later, the FIFO storage structure 130 can at any point in time only store data packets being transferred in one direction between a master device 100, 110 and a slave device connected to an external input/output port 170.

A data precondition Finite State Machine (FSM) 140 is employed as an interface to the FIFO data structure 130 from the slave device side. For data packets being transferred to the slave device the FSM 140 is able to pop data packets from the FIFO storage structure 130, and to perform some preliminary decoding of the data packets in order to determine the type of transaction to which those data packets relate, and to use that information to then seek to optimise the transfer to the slave device. As an example, for a write transaction, this may involve the collation of data from one or more data packets for transferring in some more optimised format to the slave device.

The data output by the FSM 140 is passed through Cyclic Redundancy Code (CRC) logic 150 which adds certain bits used for error correction purposes, whereafter the data is output via the parallel/serial shift register 160 to the external input/output port 170 for transferring to the slave device.

Similarly data packets received by the host controller 30 from the slave device are routed via the external input/output port 170 to the shift register 160, from where they are routed to the CRC logic 150 to enable error correction procedures to be performed. The data is then routed to the FSM 140 where it is re-converted as necessary into data packet form prior to being pushed onto the FIFO storage structure 130.

The bus interface logic 120 can then pop data from the FIFO storage structure 130 for onward routing via the bus infrastructure 105 to the appropriate master device 100, 110.

Figure 3:
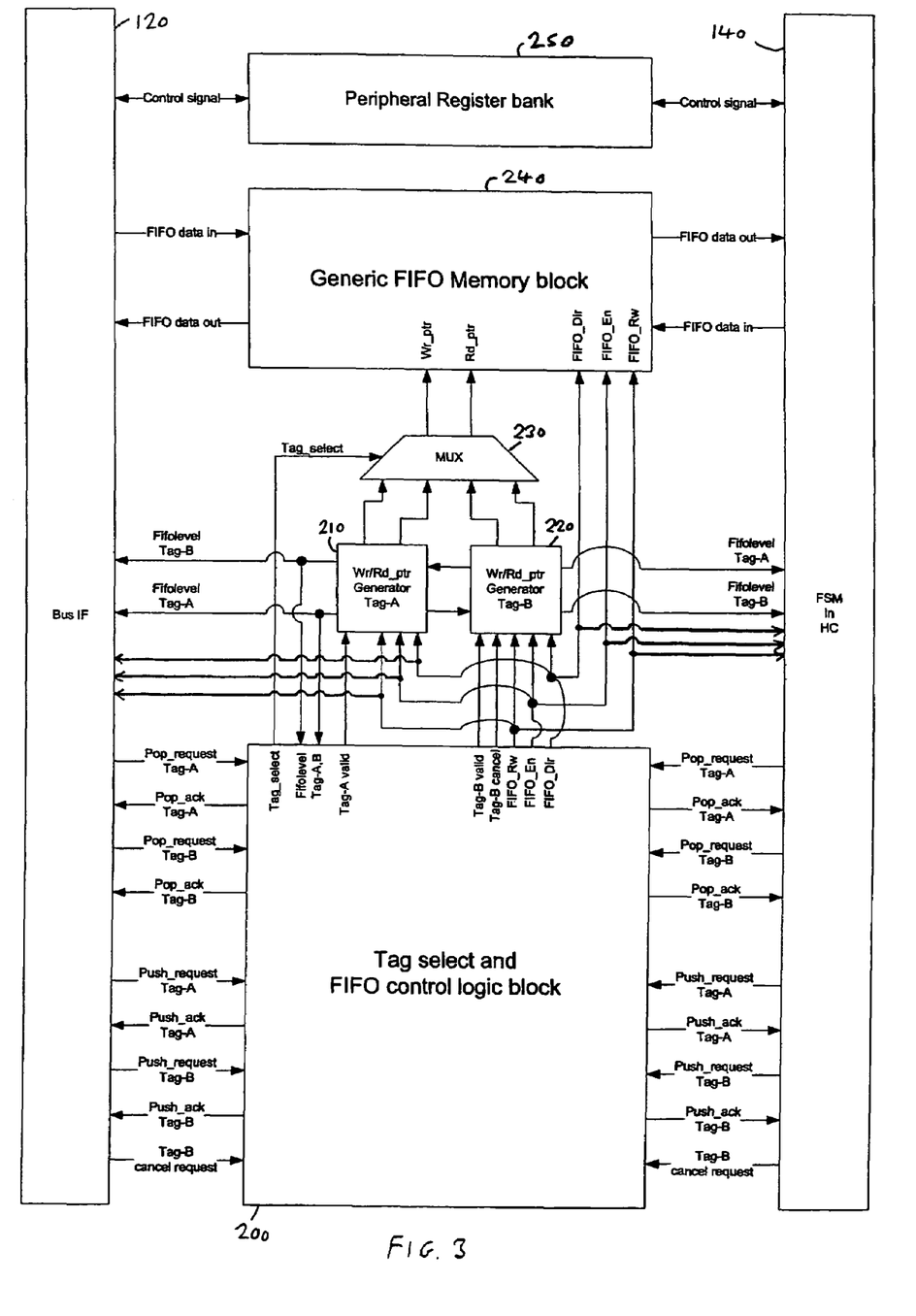
FIG. 3 is a block diagram illustrating in more detail the elements provided within the FIFO of the host controller in accordance with one embodiment of the present invention.

FIG. 3 is a block diagram illustrating in more detail the elements provided within the FIFO storage structure 130 in accordance with one embodiment of the present invention. As can be seen from FIG. 3, the FIFO structure 130 includes a generic FIFO memory block 240 in which data packets are stored, and a tag select and FIFO control logic block 200 for controlling the input and output of data from the generic FIFO memory block 240. Further, a peripheral register bank 250 is used for storing certain control information accessible by both the bus interface 120 and the FSM 140.

Data packets are pushed into the memory block 240 or popped from the memory block 240 through use of request-acknowledge signals. In particular, the bus interface 120 or the FSM 140 can issue a push request or a pop request to the logic 200, and will receive a corresponding acknowledgement form the logic 200 once that request has been actioned.

As will be discussed below in more detail, in accordance with embodiments of the present invention the memory block 240 can be arranged to operate in two different modes of operation. In a normal mode of operation the entirety of the memory block 240 is used as a single FIFO, so as to maintain the temporal order of data packets received by it. However, upon receipt of a high priority transaction, an alternative mode of operation is invoked, whereby an allocated portion of the memory block 240 is reserved for data packets of that high priority transaction, with the remaining portion being retained for buffering the data packets of non-high priority transactions. This allows the data packets of the high priority transaction to be handled out of temporal order with respect to the data packets of non-high priority transactions.

In accordance with embodiments of the present invention, all data packets associated with a transaction are tagged by the master or slave device issuing that data packet to identify whether the data packet relates to a normal transaction or a high priority transaction. In accordance with the embodiment illustrated in FIG. 3, a normal transaction will be given a tag of "A" whilst a high priority transaction will be given a tag of "B".

When the first data packet of a transaction is received by the host controller, a counter is set in the peripheral register bank 250 to identify the number of data blocks (for example data bytes, data words, etc) associated with that transaction. Each time a data packet is pushed into the memory block 240, that counter is decremented by the relevant amount. Whichever of the bus interface 120 or FSM 140 is responsible for popping the data packets from the memory block 240 can then reference that counter when determining whether the transaction has completed or not, as will be discussed later with reference to FIG. 9. A separate counter will be kept in the register bank 250 for each pending transaction.

The logic 200 is arranged to issue three global control signals dependant on the requests that it receives, these signals being routed to the memory block 240. In particular, a FIFO_En signal is set to indicate that the FIFO is enabled, and a FIFO_Dir signal is given a value indicating the direction in which data is being pushed on to the memory block or popped from the memory block, and hence identifies whether data is being supplied from or provided to the bus interface 120 or being supplied from or provided to the FSM 140. Finally, a FIFO_Rw signal is given a value indicating whether data is being read or written, and hence whether data should be popped from the memory block or pushed onto the memory block.

Read and write pointers Rd_ptr and Wr_ptr are also provided to the memory block 240 via a multiplexer (MUX) 230 to identify the locations at which data should be popped from the memory block or pushed onto the memory block, respectively.

In accordance with the FIG. 3 embodiment of the present invention, two generators 210, 220 are provided for generating read or write pointers, the first generator 210 producing read and write pointers for normal (i.e. Tag-A) transactions, and the second generator 220 generating read and write pointers for high priority (Tag-B) transactions. Both generators receive the three global control signals mentioned earlier, and in addition each generator receives a separate valid signal to identify whether data packets of its associated type of transaction are currently being handled. For example, if a push or a pop request is received relating to a normal transaction the Tag-A valid signal will be set and the Tag-B valid signal will not be set, whereas if a push or a pop request is received relating to a high priority transaction, the Tag-B valid signal will be set and the Tag-A valid signal will be reset.

The generator 220 also receives a Tag-B cancel signal which can be used for resetting the read and write pointers produced by that generator when a high priority transaction has completed, and accordingly the portion of the memory block 240 reserved for that high priority transaction can be returned for use by normal transactions.

The two generators 210, 220 also produce fifolevel signals indicating how full their respective portions of the memory block 240 are, both of these fifolevel signals being provided to the bus interface 120 and to the FSM 140 as well as to the control logic 200.

In a normal mode of operation, the Tag-B valid signal is not set, and the whole of the memory block 240 is used as FIFO memory for normal transactions. In such a mode of operation the fifolevel Tag-B signal is ignored and the value of the fifolevel Tag-A signal will vary between the maximum size of the FIFO memory block 240 (indicating that the entire FIFO is empty) and zero (indicating that the entire FIFO is full).

When a high priority transaction is initiated, a Push_request Tag-B signal will be received by the control logic block 200 which will then seek to establish an allocated portion to use for buffering data packets of the high priority transaction. Typically, such an allocated portion will have a predetermined size "SIZEVALUE$_B$", and provided the fifolevel Tag-A signal indicates that there is sufficient space to allocate such a portion, that portion will be allocated, the read and write pointers for the Tag-B area will be initialised within the generator 220, and a Tag_select signal will be driven to the MUX 230 to cause the MUX to output those pointer values to the memory block 240 so that the data packet associated with the high priority transaction is stored into the allocated portion.

Thereafter, the fifolevel Tag-B signal will indicate that there is some content in the allocated portion, and this information can be used by the bus interface 120 or the FSM 140 as appropriate to cause a Pop_request Tag-B signal to be issued. In particular, the bus interface 120 and the FSM 140 will be aware of the direction of transfer of data packets through the memory block for the high priority transaction (for example they can be arranged to receive the FIFO_Dir signal), and hence the appropriate interface 120, 140 can use the fifolevel signal as a trigger to pop data packets from the memory block 240.

With regards to determining when it is appropriate to pop data from the allocated portion, it will be appreciated that the interfaces 120, 140 could employ a number of schemes. For example, the appropriate interface may be arranged, as soon as it is determined that there is data in the allocated portion, to pop the data packet(s) from the allocated portion in preference to data packets in the remaining portion. Alternatively some form of round-robin scheme may be employed where the interface logic alternates between seeking to retrieve data packets from the allocated portion and the remaining portion.

Figure 4:
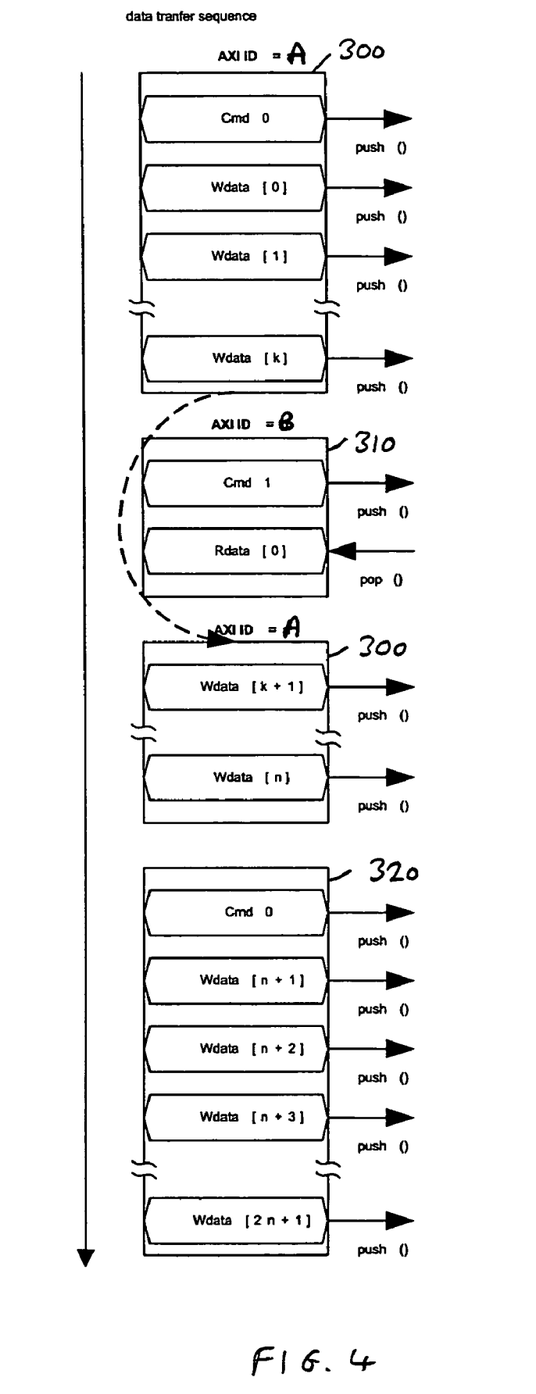
FIG. 4 illustrates an example sequence of data packets issued by a master device relating to multiple transactions, where a high priority transaction is issued during the issuance of data packets of a first write transaction.

FIG. 4 illustrates an example data transfer sequence that may take place within the data processing system of one embodiment of the present invention, and in particular indicates the situation where a burst write transfer 300 is interrupted by an interrupt transaction 310. In particular, the write transaction, which is a normal transaction, is given a tag of A, and hence the various data packets will be pushed into the FIFO structure 130 in temporal order. If the allocated portion has already been established, and hence the FIFO structure 130 is operating in the alternative mode of operation, the data packets for the write transaction will be stored in the remaining portion of the memory block 240, whilst the allocated portion is reserved for high priority transactions. If instead the allocated portion has not been established, i.e. the FIFO structure is operating in the normal mode of operation, the whole of the memory block 240 will be available for receiving the data packets of the write transaction. Typically, each data packet will include a header and a data portion and hence the Cmd 0 data packet illustrated in FIG. 4 will, in addition to identifying the start of a write transaction, potentially also includes some of the write data. Similarly the subsequent data packets identified as Wdata packets will in addition to the data also include a command portion identifying that these data packets are part of the write transaction.

After transmission of the k-th Wdata data packet of the write transaction, a command data packet relating to a high priority transaction (with a tag of B) is issued for pushing onto the FIFO structure 130. In the particular example illustrated in FIG. 4, this command has been issued because the bus interface 120 has determined that there is data to be popped form the allocated portion of the memory block 240, and hence in this example it is assumed that an earlier high priority transfer has occurred causing the allocated portion to be reserved (i.e. the FIFO structure is operating in the alternative mode of operation).

Typically, in a prior art system where only a single mode of operation of the memory block was provided, and the whole memory block operated as a FIFO, the propagation of the Cmd 1 command relating to the high priority transaction would not occur until all existing entries in the FIFO were drained. However, in accordance with embodiments of the present invention, since the allocated portion has been established the Cmd 1 data packet can be placed in the allocated portion and then can be popped from the memory block without waiting for the earlier data packets in the remaining portion of the buffer storage to first have been drained. The actioning of this command will cause the data packet Rdata [0] in the allocated portion to be popped from the memory block and returned to the bus interface 120.

As shown in FIG. 4, subsequent data packets pertaining to the write transaction 300 can then be pushed into the remaining portion of the buffer storage and indeed so can the data packets relating to a subsequent write transaction 320.

It is worth noting that the data packets of a high priority transaction can immediately be stored within the allocated portion provided that the allocated portion has been set up and that there is sufficient space in the allocated portion for the data packet. Thereafter, they can readily be popped from the memory block without waiting for any earlier data packets in the remaining portion of the buffer storage to have first been drained. This hence significantly reduces the latency in handling such high priority transactions.

Furthermore, assuming at the time a high priority transaction is initiated the buffer storage is operating in the normal mode of operation, and accordingly the allocated portion has not yet been set up, then the allocated portion can immediately be reserved provided that there is sufficient space in the memory block for the allocated portion. Hence, in the worst case, the time it takes to reserve the allocated portion is governed by the situation where the FIFO memory block 240 is already full at the time the allocated portion is to be reserved, in which case the delay is merely the delay taken to drain the required number of data packets form the memory block in order to release the required size for the allocated portion. Thereafter, the high priority data packet can be stored in the allocated portion and then readily retrieved from the allocated portion for processing. Without the use of such an embodiment, then it will be appreciated that if the FIFO were full at the time the high priority data packet was received, then the time taken for the high priority data packet to be propagated through the memory block for processing would equate to the time taken for the entire FIFO memory block 240 to drain. Accordingly, through use of the above described embodiment of the present invention, a significant reduction in latency in the handling of high priority data packets is realised.

Figure 5:
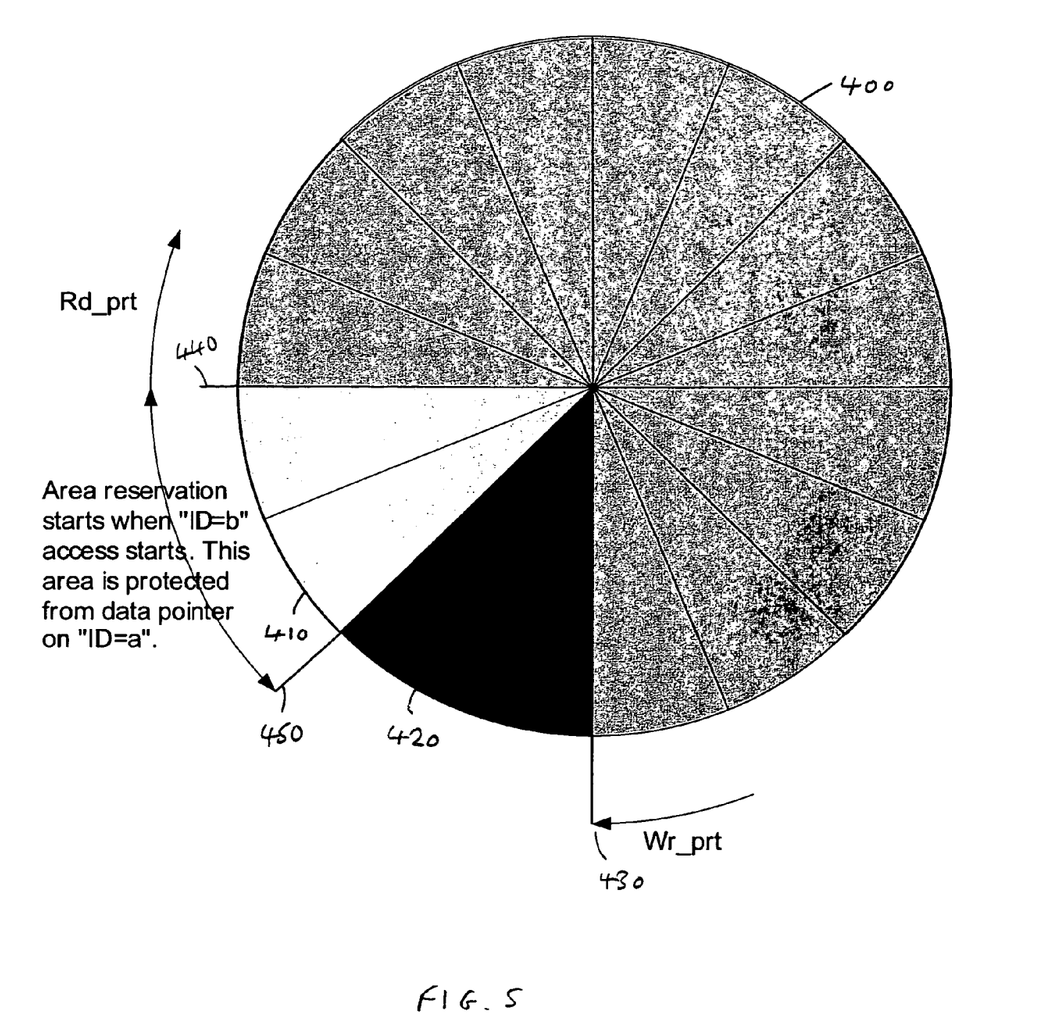
FIG. 5 is a diagram illustrating the reserving of an allocated portion within the storage buffer for storing data packets relating to high priority transactions in accordance with one embodiment of the present invention.

FIG. 5 is a diagram schematically illustrating the reserving of an allocated portion within the memory block 240. If the memory block 240 is considered as comprising a plurality of segments, with each segment being used to store a data packet, then the allocated portion will require the reserving of a predetermined number of segments for use for high priority data packets. In the example illustrated in FIG. 5, it is assumed that at the time the allocated portion needs to be reserved, three quarters of the FIFO memory block 240 currently contains data packets 400 of normal (i.e. none-high priority) transactions. Further, it is assumed that the allocated portion requires two segments to be reserved. In this instance, the Fifolevel Tag-A signal indicates that there is sufficient space for the allocated portion to be reserved, and accordingly two segments 410 are reserved for the allocated portion.

The read and write pointers for this allocated portion are then established by setting both pointers to be equal to the current read pointer of the normal region minus the size of two segments. Hence, the write pointer for the normal, remaining portion is at point 430, the read pointer for the normal, remaining portion is at point 440, and the read and write pointers for the allocated portion are at point 450. Once the allocated portion has been reserved, the control logic block 200 of FIG. 3 will send the necessary Tag_select signal to the MUX 230 to cause the read and write pointers for the memory block 240 to be selected to be the value of the read and write pointers produced by the generator 220, and hence initially both read and write pointers will be set to the point 450 in FIG. 5.

Figure 6:
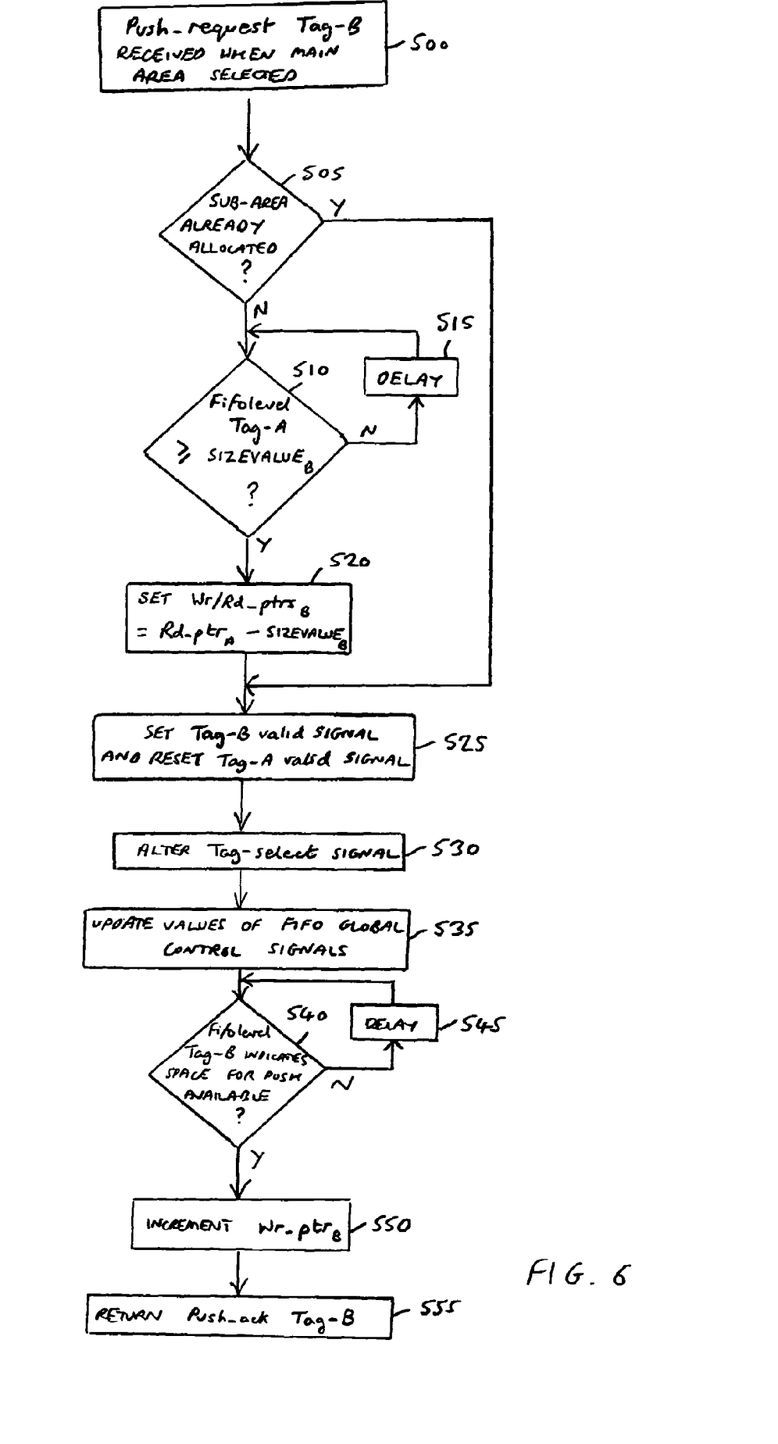
FIGS. 6 to 9 are flow diagrams illustrating various processes performed by the logic of FIG. 3 in accordance with one embodiment of the present invention.

FIGS. 6 to 9 are flow diagrams illustrating various operations performed by the logic of FIG. 3. FIG. 6 is a flow diagram illustrating the processes performed when a Push_request Tag-B signal is received by the control logic 200 when the main area is currently selected. The main area will either be the entirety of the FIFO memory block 240 when it is operating in the normal mode of operation, or will be the remaining portion of the memory block when it is operating in the alternative mode of operation and accordingly the allocated portion (also referred to herein as the sub-area) has already been reserved. At step 505 it is determined whether the sub-area has already been allocated, and if so the process proceeds directly to process 525. However, if the sub-area has not already been allocated, then at step 510 the control logic block 200 determines whether the value of the Fifolevel Tag-A signal is greater than or equal to $SIZEVALUE_B$ (i.e. the predetermined size required for the allocated portion). Hence, the purpose of this determination is to decide whether there is sufficient space in the memory block for reserving the allocated portion. If there is not, then a delay is inserted at step 515, whereafter step 510 is repeated. During this delay, it is likely that one or more data packets will be popped from the memory block and accordingly at some point it will be determined that the Fifolevel Tag-A value does exceed the $SIZEVALUE_B$ value. When this is determined, the process proceeds to step 520 where the read and write pointers for Tag-B are set equal to $Rd\_ptr_A - SIZEVALUE_B$.

Thereafter at step 525 the Tag-B valid signal is set and the Tag-A valid signal is reset so as to switch pointer generation from generator 210 to generator 220. Thereafter, at step 530 the Tag-select signal is altered so as to cause the MUX 230 to select the outputs form the generator 220. In addition, at step 535, the values of the three FIFO global control signals are updated as appropriate to enable the FIFO, to identify whether a read or write to the FIFO is taking place, and to specify the direction (i.e. from which side of the memory block 240 data packets will be pushed and popped).

Whilst steps 520, 525, 530 and 535 have been shown in a particular order in FIG. 6, it will be appreciated that certain of these steps may be performed in parallel and/or in a different order dependent on the embodiment.

At step 540, it is then determined from the Fifolevel Tag-B signal whether there is sufficient space to perform the push operation. In the event that the sub-area has just been allocated, this will clearly be the case and the process will proceed to step 550. However, if at step 505 it had been determined that the sub-area had already been allocated, then it may be possible at step 540 that the allocated portion does not have sufficient space for the current push operation to take place, in which event a delay is inserted at step 545, after which step 540 is repeated.

Once the Fifolevel Tag-B signal indicates sufficient space for the push, then this will indicate to the control logic 200 that the memory block 240 will have stored the received data packet, and accordingly at step 550 the generator 220 will implement the write pointer $Wr\_ptr_B$ and further at step 555 the control logic 200 will return a Push_ack Tag-B signal to the interface 120, 140 that issued the Push_request Tag-B signal at step 500.

Figure 7:
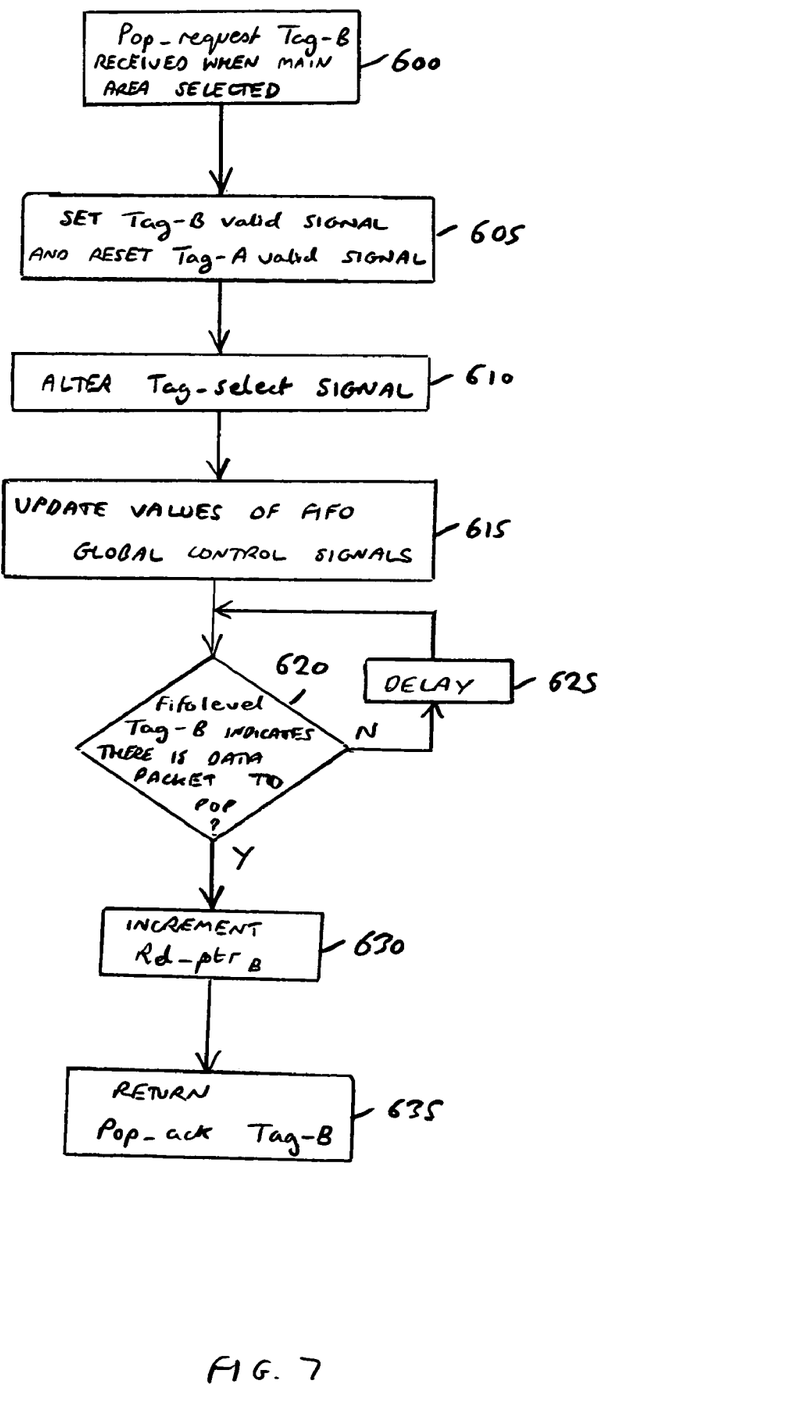

FIG. 7 is a flow diagram illustrating the processes performed when a Pop_request Tag-B signal is received by the control logic 200 from either the bus interface 120 or the FSM 140 when the main area is selected. In order for a Pop_request Tag-B signal to have been issued then a Push_request Tag-B signal must have already been issued, and accordingly the sub-area will be already reserved. Accordingly, in contrast to the flow of FIG. 6, there is no need to determine whether the sub-area has been allocated. At step 605 the Tag-B valid signal is set and the Tag-A valid signal is reset in order to select the generator 220 in preference to the generator 210. Thereafter, at step 610, the Tag_select signal is altered to cause the MUX 230 to output as the read and write pointers those pointers generated by the generator 220. At step 615 the values of the FIFO global control signals are updated as appropriate. It will be appreciated that the steps 605, 610 and 615 do not necessarily need to be performed in the order identified in FIG. 7, and indeed some steps can be performed in parallel.

At step 620, it is determined whether the Fifolevel Tag-B signal indicates that there is a data packet to pop. This will be the case unless the sub-area is empty. If the sub-area is empty, then a delay will be imposed at step 625, prior to returning to step 620.

Once it is determined at step 620 that there is data in the sub-area to be popped then this will indicate that the memory block 240 has output a data packet from the sub-area to the destination interface 120, 140 and accordingly at step 630 the generator 220 increments the read pointer $Rd\_ptr_B$ and at step 635 the control logic block 200 returns a Pop-ack Tag-B signal to the interface 120, 140 that issued the Pop_request Tag-B signal at step 600.

Figure 8:
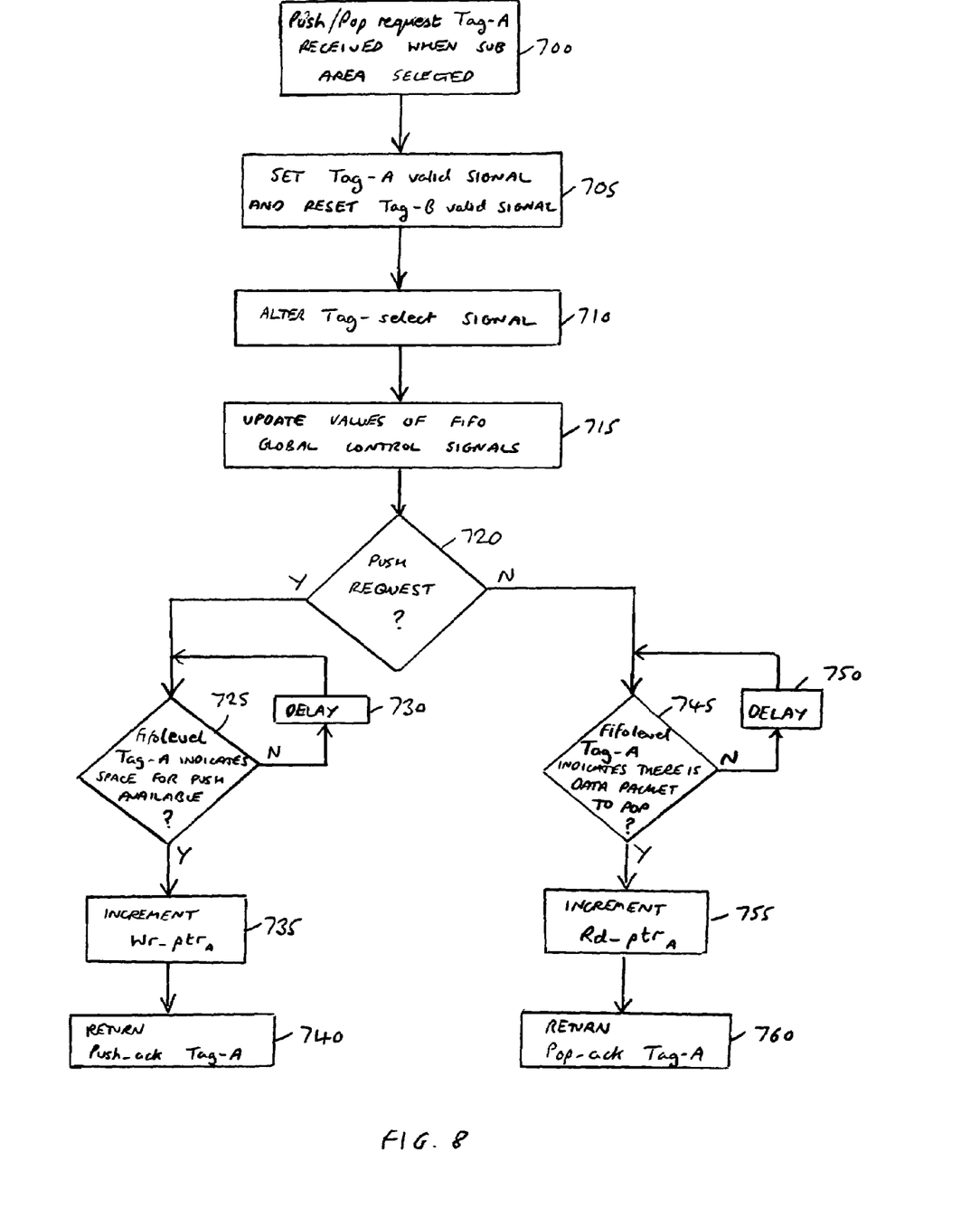

FIG. 8 is a flow diagram illustrating the processes performed when the control logic block 200 receives either a push or a pop request for a normal transaction when the sub-area (i.e. the area for high-priority transactions) is currently selected. At step 705, the Tag-A valid signal is set and the Tag-B valid signal is reset in order to cause the generator 210 to generate the read and write pointers instead of generator 220. At step 710 the Tag_select signal is altered to cause the MUX 230 to output the read and write pointers generated by the generator 210, and at step 715 the FIFO global control signals are updated as required by the control logic block 200. As with the corresponding steps in FIGS. 6 and 7, steps 705, 710 and 715 need not be performed in the exact order shown in FIG. 8 and indeed certain steps can be performed in parallel.

At step 720, the processing branches dependant on whether the request received was a push request or a pop request. If the request was a push request, then at step 725, it is determined whether the Fifolevel Tag-A signal indicates that there is sufficient space to perform the push operation. If not, a delay is introduced at step 730, prior to returning to step 725. Once space is available for the push request, then this indicates that the memory block 240 will have placed the received data packet into the location of the memory block 240 indicated by the write pointer, and at step 735 the write pointer is then incremented by the generator 210. In addition, at step 740 a Push-ack Tag-A signal is returned to the interface 120, 140 that issued the push request at step 700.

If at step 720 it is determined that the request is a pop request then the process proceeds to step 745, where it is determined from the Fifolevel Tag-A signal whether there is a data packet to be popped from the main area. If not, then a delay is introduced at step 750, prior to returning to step 745. Otherwise, if there is a data packet to be popped, then this will indicate that the memory block 240 will have output a data packet form the location indicated by the read pointer, and accordingly at step 755 the read pointer is incremented by the generator 210, and then at step 760 a Pop-ack Tag-A signal is returned to the interface 120, 140 that issued the pop request at step 700.

If a push or a pop request is received pertaining to the main area when the main area is already selected, or pertaining to the sub-area when the sub-area is already selected, then it will be appreciated that the need for much of the above described processes steps are obviated. In particular, if a Push_request Tag-B signal is received when the sub-area is already selected then, with reference to FIG. 6, only steps 540 to 555 need to be performed, whilst similarly if a Pop_request Tag-B signal is received when the sub-area is already selected only steps 620 to 635 need to be performed (see FIG. 7). Similarly, regarding FIG. 8, if a push or pop request for the main area is received when the main area is already selected, then only steps 725 to 740 or 745 to 760, respectively, need to be performed.

In one embodiment of the present invention, the sub-area is released once the high priority transaction has been completed. Hence, at this point, the memory block returns from the alternative mode of operation to the normal mode of operation in which the entire memory block is used as a single FIFO storage. The process of releasing the sub-area will be described in more detail with reference to FIG. 9.

Figure 9:
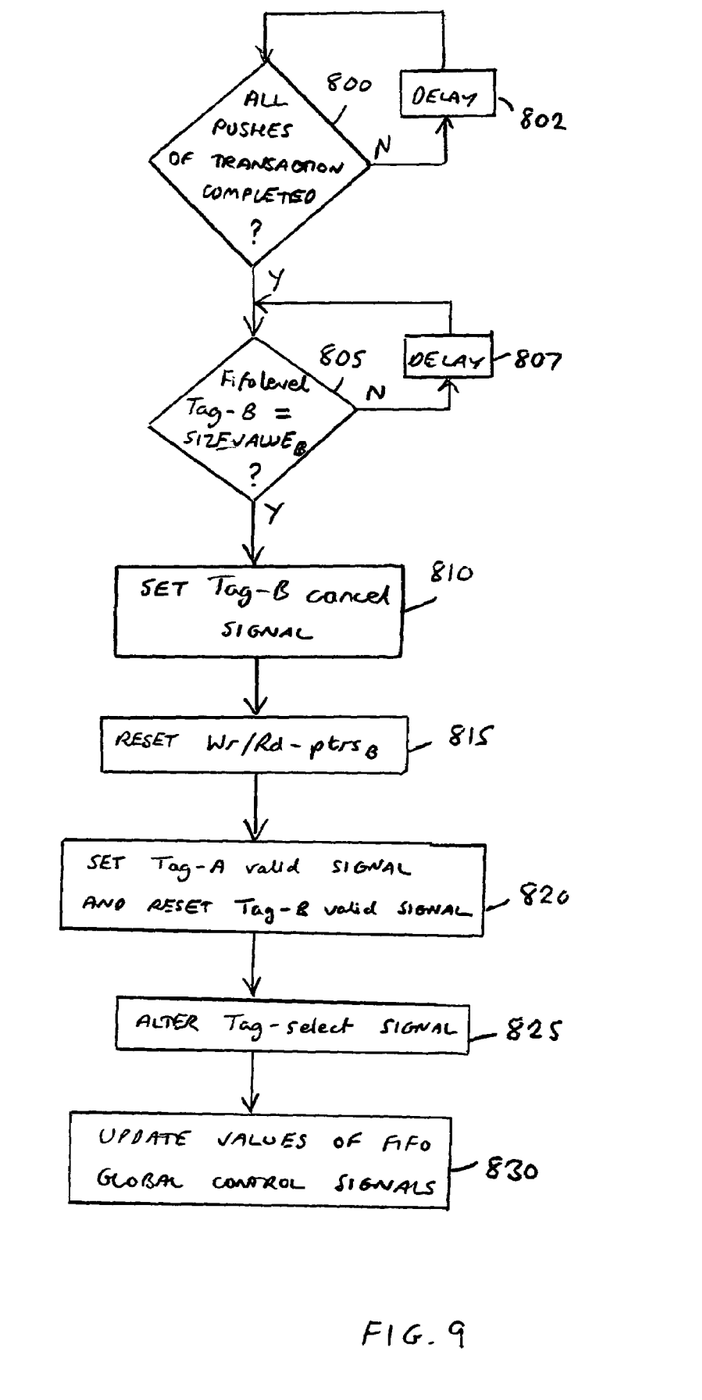

At step 800, it is determined whether all pushes of the high priority transaction have been completed. This determination can be made by the bus interface 120 or FSM 140 with reference to the value of the relevant counter within the peripheral register bank 250. In particular, if the counter value is at zero this will indicate that all pushes have taken place. If all pushes have not been completed, then a delay is introduced at step 802 prior to returning to step 800.

If it is determined at step 800 that all pushes of the transaction have been completed, then the process proceeds to step 805, where it is determined whether the Fifolevel Tag-B signal is equal to SIZEVALUE$_B$, i.e. the maximum size of the allocated portion. If it is, then this indicates that the allocated portion is empty. If the Fifolevel Tag-B signal is not equal to SIZEVALUE$_B$, a delay is introduced at step 807 prior to returning to step 805. However, when it is determined at step 805 that the allocated portion is empty, then the process proceeds to step 810 where the Tag-B cancel signal is set by the interface 120, 140 that has made the determination at steps 800, 805.

This Tag-B cancel signal is received by the control logic block 200 and is propagated to the generator 220 to cause the read and write pointers for the sub-area to be reset at step 815. Further, at step 820 the control logic block 200 sets the Tag-A valid signal and resets the Tag-B valid signal to cause the generator 210 to be used instead of the generator 220.

At step 825, the Tag_select signal is altered in order to cause the MUX 230 to select the output from the generator 210, and at step 830 the values of the FIFO global control signals are updated. At this point, the entirety of the memory block 240 is now used as a FIFO memory, and in particular the segments previously reserved for the allocated region are now available for use in storing the data packets of non-high priority transactions. Steps 815, 820, 825 and 830 need not be performed in the exact order illustrated in FIG. 9, and indeed certain steps may be performed in parallel.

In accordance with the above described embodiment of the present invention, it can be seen that in the normal mode of operation the FIFO memory block 240 of the host controller 30 operates as a standard FIFO, so as to maintain the temporal order of data packets received by it. However, upon receipt of a high priority transaction, an alternative mode of operation can be invoked whereby a sub-area of the memory block is reserved as an allocated portion for the data packets of high priority transactions, with the remaining portion being used for other transactions. Typically, this sub-area is of a fixed size and is only reserved when a high priority transaction is in progress. In one particular example implementation in which a slave device in the form of a flash-based removable memory device is used, page access type commands are assigned to the main area of the memory block and interrupt type commands are assigned to the sub-area, and the fixed size chosen for the sub-area is determined having regards to data traffic balance. Typically, in such implementations, the proportion of the memory block allocated to the sub-area is a relatively small part of the total FIFO memory block size. As soon as the high priority transaction has completed, the sub-area is released so that once again the entirety of the memory block can be used as a single FIFO.

Through use of such embodiments, the cost and complexity of the controller can be kept to a minimum, since only a single FIFO memory block is utilised, and hence there is no requirement to duplicate certain parts of the circuitry in order to facilitate the handling of the high priority transactions. Instead, on the occurrence of such high priority transactions, an alternative mode of operation is entered in which for the duration of the high priority transaction, an allocated portion of the buffer storage is reserved for buffering data packets of that high priority transaction, thereby providing on a limited basis a secondary FIFO function for the data packets of the high priority transaction. As soon as the high priority transaction has completed, normal operation is resumed and the allocated portion is released.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus for handling transactions issued to a slave device from a master device, each transaction involving the transfer of one or more data packets between the master device and the slave device, the data processing apparatus comprising:

a buffer storage operable to buffer the data packets of one or more transactions during transfer of those data packets between the master and slave devices;

buffer control logic operable to control the operation of the buffer storage;

in a normal mode of operation the buffer control logic being operable to cause the buffer storage to operate as a FIFO storage for buffering the data packets so as to maintain the temporal order of those data packets;

upon receipt of a high priority transaction, the buffer control logic being operable to cause the buffer storage to operate in an alternative mode of operation in which an allocated portion of the buffer storage is reserved for buffering data packets associated with that high priority transaction, whilst a remaining portion of the buffer storage is retained for buffering of the data packets of other transactions;

whereby when the buffer storage is operating in the alternative mode of operation data packets in the allocated portion may be output from the buffer storage out of temporal order with respect to data packets in the remaining portion.

2. A data processing apparatus as claimed in claim 1, wherein each transaction has a tag value associated therewith to indicate a type of the transaction, the buffer control logic being operable to detect the high priority transaction from its associated tag value.

3. A data processing apparatus as claimed in claim 1, wherein upon completion of the high priority transaction the buffer control logic causes the buffer storage to return to the normal mode of operation.

4. A data processing apparatus as claimed in claim 1, wherein the allocated portion is of a predetermined size.

5. A data processing apparatus as claimed in claim 1, wherein the allocated portion is reserved in an area of the storage buffer that is unused at the time of entering the alternative mode of operation.

6. A data processing apparatus as claimed in claim 1, in which the high priority transaction is an interrupt transaction.

7. A data processing apparatus as claimed in claim 1, wherein more than one transaction is a high priority transaction and the allocated portion of the buffer storage is used to store the data packets associated with any received high priority transaction, with the remaining portion being used to store the data packets of any transactions which are not high priority transactions.

8. A data processing apparatus as claimed in claim 1, wherein the slave device is a storage device.

9. A data processing apparatus as claimed in claim 1, wherein in the normal mode of operation the buffer storage may only store data packets being transferred in the same direction between the master and slave devices, whereas in the alternative mode of operation the buffer storage may store in the allocated portion data packets being transferred in a different direction to those data packets in the remaining portion.

10. A method of handling transactions issued to a slave device from a master device, each transaction involving the transfer of one or more data packets between the master device and the slave device, the method comprising the steps of:
   buffering within a buffer storage the data packets of one or more transactions during transfer of those data packets between the master and slave devices;
   in a normal mode of operation, causing the buffer storage to operate as a FIFO storage for buffering the data packets so as to maintain the temporal order of those data packets;
   upon receipt of a high priority transaction, causing the buffer storage to operate in an alternative mode of operation in which an allocated portion of the buffer storage is reserved for buffering data packets associated with that high priority transaction, whilst a remaining portion of the buffer storage is retained for buffering of the data packets of other transactions;
   when the buffer storage is operating in the alternative mode of operation, outputting from the buffer storage data packets in the allocated portion out of temporal order with respect to data packets in the remaining portion.

11. A method as claimed in claim 10, wherein each transaction has a tag value associated therewith to indicate a type of the transaction, and the method comprises the step of detecting the high priority transaction from its associated tag value.

12. A method as claimed in claim 10, wherein upon completion of the high priority transaction the method further comprises the step of causing the buffer storage to return to the normal mode of operation.

13. A method as claimed in claim 10, wherein the allocated portion is of a predetermined size.

14. A method as claimed in claim 10, wherein the allocated portion is reserved in an area of the storage buffer that is unused at the time of entering the alternative mode of operation.

15. A method as claimed in claim 10, in which the high priority transaction is an interrupt transaction.

16. A method as claimed in claim 10, wherein more than one transaction is a high priority transaction and the allocated portion of the buffer storage is used to store the data packets associated with any received high priority transaction, with the remaining portion being used to store the data packets of any transactions which are not high priority transactions.

17. A method as claimed in claim 10, wherein the slave device is a storage device.

18. A method as claimed in claim 10, wherein in the normal mode of operation the buffer storage may only store data packets being transferred in the same direction between the master and slave devices, whereas in the alternative mode of operation the buffer storage may store in the allocated portion data packets being transferred in a different direction to those data packets in the remaining portion.

19. A data processing apparatus for handling transactions issued to a slave device from a master device, each transaction involving the transfer of one or more data packets between the master device and the slave device, the data processing apparatus comprising:
   buffer means for buffering the data packets of one or more transactions during transfer of those data packets between the master and slave devices;
   buffer control means for controlling the operation of the buffer means;
   in a normal mode of operation the buffer control means being operable to cause the buffer means to operate as a FIFO storage for buffering the data packets so as to maintain the temporal order of those data packets;
   upon receipt of a high priority transaction, the buffer control means being operable to cause the buffer means to operate in an alternative mode of operation in which an allocated portion of the buffer means is reserved for buffering data packets associated with that high priority transaction, whilst a remaining portion of the buffer means is retained for buffering of the data packets of other transactions;
   whereby when the buffer means is operating in the alternative mode of operation data packets in the allocated portion may be output from the buffer means out of temporal order with respect to data packets in the remaining portion.

* * * * *